United States Patent
Batho et al.

(10) Patent No.: US 9,649,702 B2
(45) Date of Patent: May 16, 2017

(54) 360° ROTATABLE DRILL SHEAR ATTACHMENT

(71) Applicant: Malco Products, Inc., Annandale, MN (US)

(72) Inventors: Thomas A. Batho, South Haven, MN (US); John T. Ryan, Dassel, MN (US)

(73) Assignee: Malco Products, Inc., Annandale, MN (US)

( * ) Notice: Subject to any disclaimer, the term of this patent is extended or adjusted under 35 U.S.C. 154(b) by 140 days.

(21) Appl. No.: 14/748,891

(22) Filed: Jun. 24, 2015

(65) Prior Publication Data

US 2016/0375510 A1    Dec. 29, 2016

(51) Int. Cl.
*B23D 29/00* (2006.01)
*B26B 15/00* (2006.01)
*B23B 45/00* (2006.01)

(52) U.S. Cl.
CPC .......... *B23D 29/005* (2013.01); *B23B 45/003* (2013.01); *B26B 15/00* (2013.01)

(58) Field of Classification Search
CPC ...... B23D 29/005; B26B 45/003; B26B 15/00
USPC .......................................................... 30/500
See application file for complete search history.

(56) References Cited

U.S. PATENT DOCUMENTS

| | | | |
|---|---|---|---|
| 1,651,823 A * | 12/1927 | Kelleher | B23D 29/005 30/228 |
| 2,047,483 A | 7/1936 | McArdle et al. | |
| 2,256,779 A | 9/1941 | McHenry | |
| 2,273,376 A * | 2/1942 | Reynolds | B23D 29/005 30/247 |
| 2,604,695 A | 7/1952 | McGary et al. | |
| 2,635,335 A | 4/1953 | James | |
| 2,760,265 A * | 8/1956 | Draenert | C14B 5/00 144/136.95 |
| 3,025,599 A * | 3/1962 | Sauers | B23D 29/005 215/278 |
| 3,654,700 A | 4/1972 | Pawloski | |
| 3,876,015 A * | 4/1975 | Kivela | A01D 69/02 144/35.1 |
| 4,682,416 A | 7/1987 | Stolfa | |

(Continued)

*Primary Examiner* — Hwei C Payer
(74) *Attorney, Agent, or Firm* — Briggs and Morgan, P.A.; Gerald E. Helget

(57) ABSTRACT

A 360° rotatable drill shear attachment has a housing with forward extending shear blades and a rearward extending drive bit connectable to a chuck of a portable hand drill. A cowling is fixed to a mounting flange and rearward of the shear housing protectively covering the drive bit and drill chuck. A circular clamp is rotatable and securable to the mounting flange. Left and right rails slide-ably adjust lengthwise and pivotally extend from the clamp along the left and right sides of the drill body to a point beyond the rear of the drill body to a drill rear end. A connector adjustably is fastened to the rear ends of the rails to adjustably draw the ends together for securing the shear attachment to the drill body. The clamp may be loosened to rotate the mounting flange of shear attachment, and shear blades, within the clamp for shear blade orientation anywhere along a 360° axial arc. After which, the clamp is tightened for safe, one-handed operation of the drill with the shear attachment and shear blades oriented in the desired direction.

17 Claims, 3 Drawing Sheets

(56) References Cited

U.S. PATENT DOCUMENTS

| | | | | |
|---|---|---|---|---|
| 5,224,231 | A | * | 7/1993 | Nacar ........................ B08B 1/00 15/160 |
| 5,901,447 | A | * | 5/1999 | Dunning ................. B26B 15/00 30/228 |
| D488,695 | S | | 4/2004 | Peterson |
| D512,623 | S | * | 12/2005 | Huang ............................ D8/70 |
| D513,953 | S | | 1/2006 | Peterson |
| 7,093,365 | B2 | | 8/2006 | Peterson |
| D730,141 | S | | 5/2015 | Moss et al. |
| 2006/0112566 | A1 | * | 6/2006 | Peterson ............... B23B 45/003 30/194 |
| 2016/0023289 | A1 | * | 1/2016 | Moss .................... B23D 29/005 30/228 |
| 2016/0375510 | A1 | * | 12/2016 | Batho ................. B23D 29/005 30/194 |

* cited by examiner

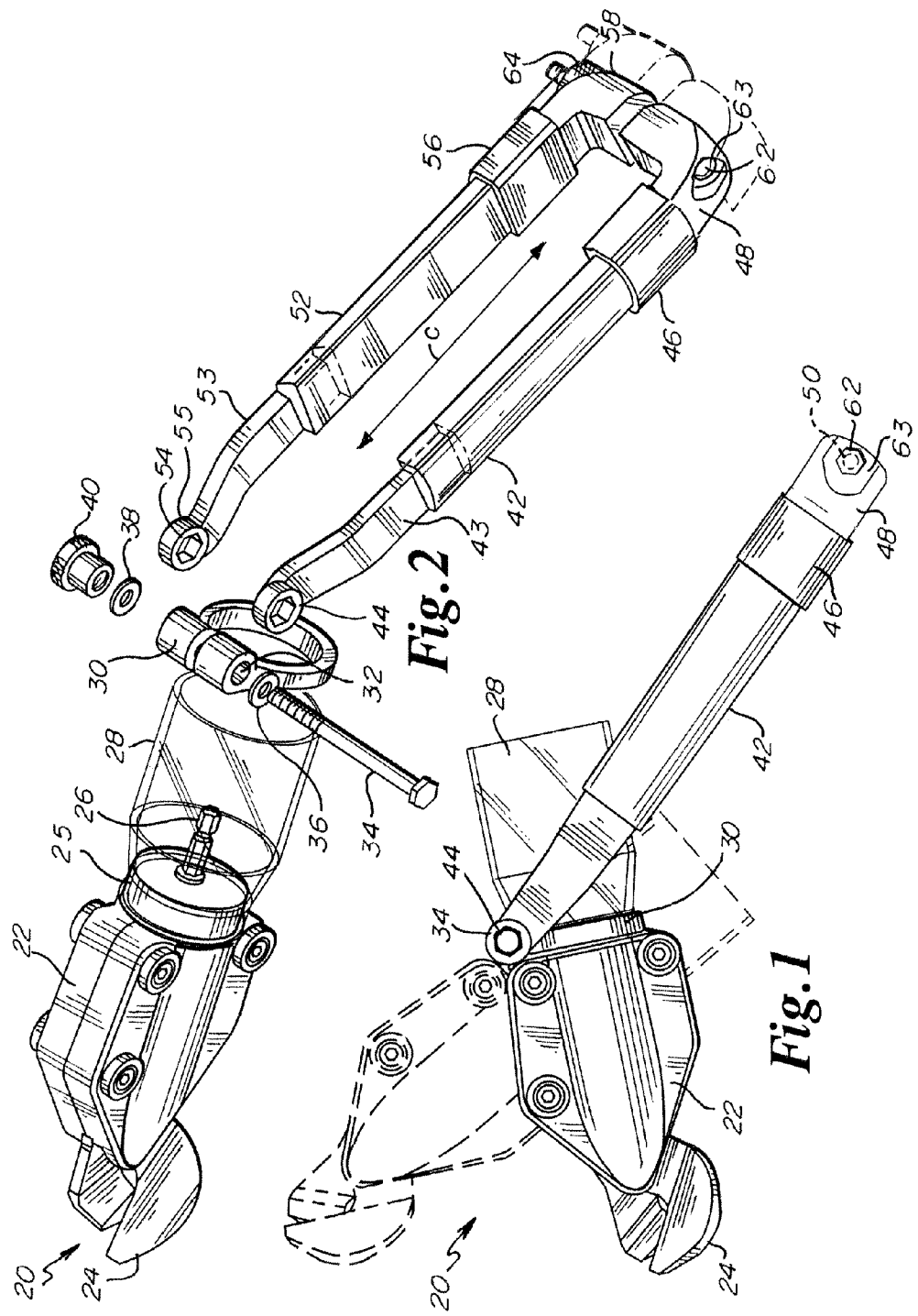

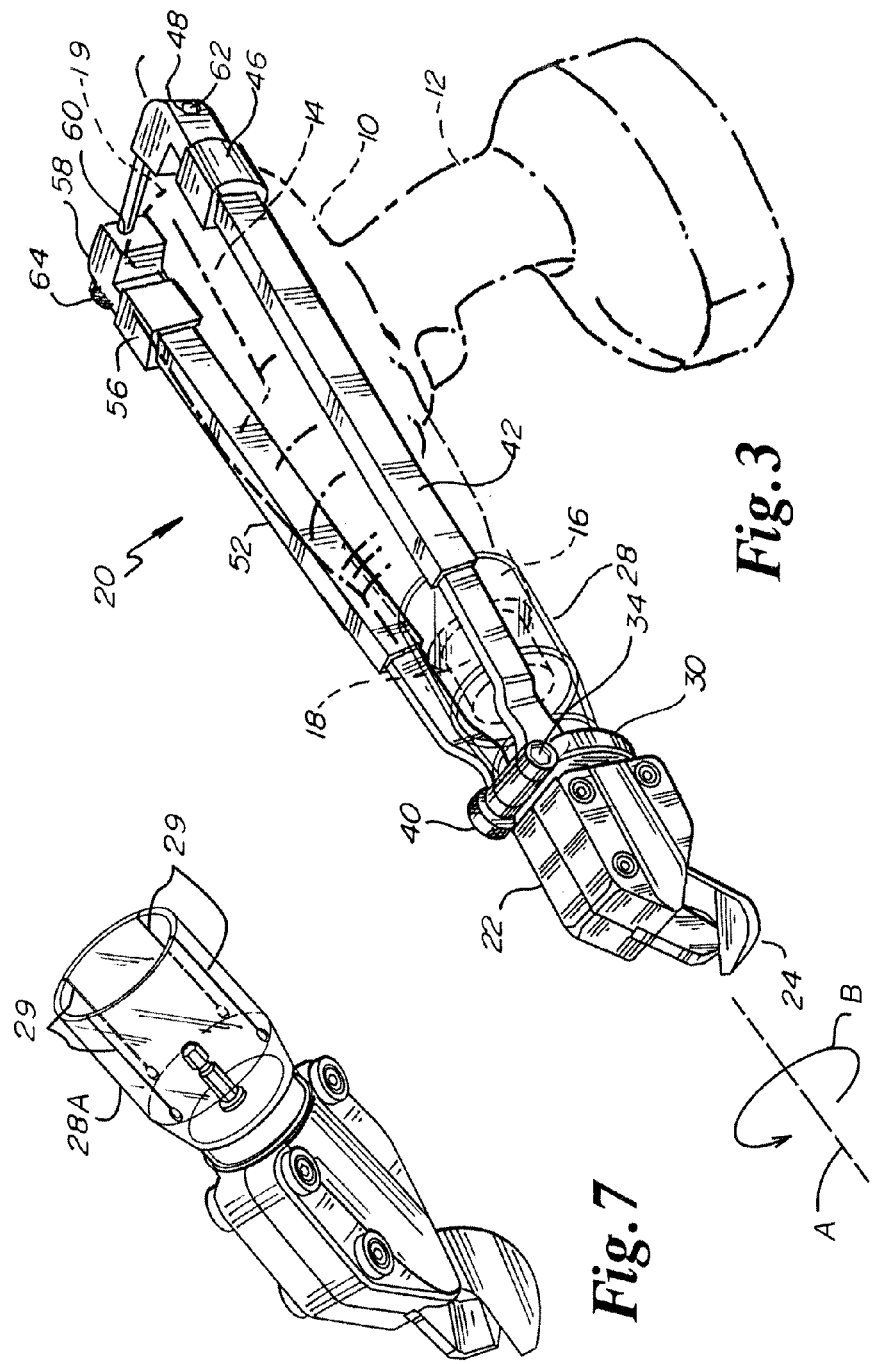

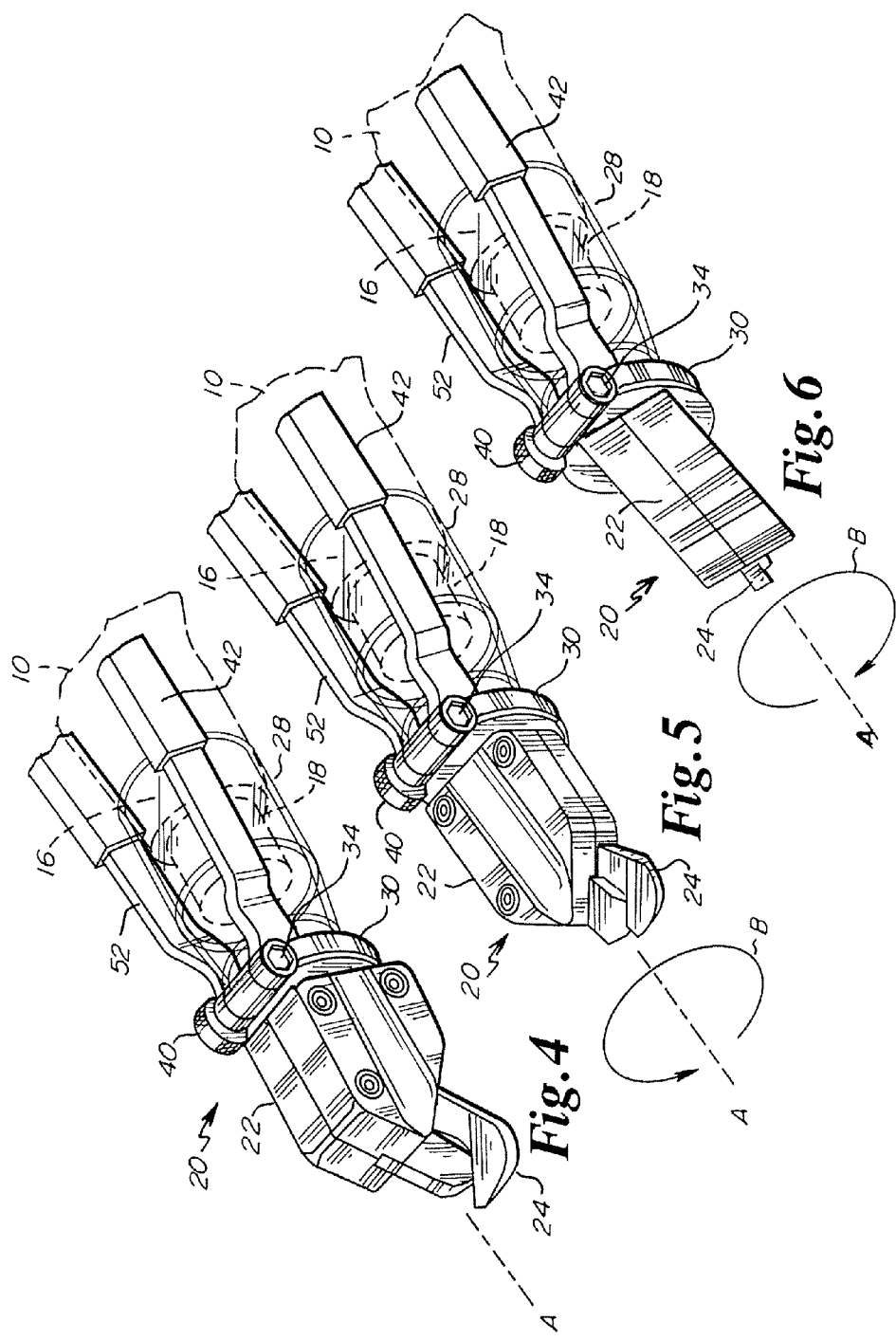

360° ROTATABLE DRILL SHEAR ATTACHMENT

BACKGROUND OF THE INVENTION

The present invention relates to a 360° rotatable drill shear attachment for a portable hand drill and more particularly to a drill shear attachment securable to the drill body to permit shear attachment axial rotation in relation to the hand drill and to permit safe, one-handed operation of the drill with the axially rotatable shear attachment.

Building materials include metal panels, steel mesh, galvanized sheet metal, furnace jackets, spiral ducts, stone coated metal shingles and various types of corrugation metal panels. Panels that are also to be cut include automotive body panels for repair and replacement. U.S. Pat. No. 2,047,483 shows an example of an electric shear which has replaced hand operated shears. U.S. Pat. No. 2,256,779 shows a shear attachment for a power drill unit. This attachment is quite cumbersome and not capable of navigating tight curves, patterns, or squares in heavy-duty gauge steel. U.S. Pat. No. 2,604,695 shows a hand-operated shear which has been used for decades to cut metal sheets and panels. U.S. Pat. No. 2,635,335 shows a power driven hand-held sheet metal shear attachable to a drill with a one-way stabilizer that gives limited positioning of the attached metal shear. U.S. Pat. No. 3,654,700 shows a shear cutting head with a pair of movable jaws that supposedly does not cause severed distortion of the material to be cut. U.S. Pat. No. 4,682,416 shows a metal cutting shear attachment securable to the collar of a portable drill.

Assignee's U.S. design Pat. D488,695 shows a simple drill shear attachment to a portable drill with a generally vertically oriented handle thereby requiring two-handed operation of the drill with the shear attachment. Assignee also has U.S. Pat. Nos. D513,953 and 7,093,365 for shear attachments with no shear attachment rotation ability.

There is a need for a 360° rotatable shear attachment safely secured to the chuck of portable drill as well as to the elongate drill body for single-handed operations of the shear attachment in any rotatable position in relation to the hand drill which will not allow hair or loose clothing to come into contact with the rotating drill chuck or attachment drive bit possibly causing harm to the operator.

SUMMARY OF THE INVENTION

A 360 degree rotatable drill shear attachment has a housing with forward extending shear blades, a rearward extending mounting flange, and a rearward extending drive bit connectable to a chuck of a portable hand drill. A cowling is fixed to the mounting flange rearward of the shear housing protectively covering the drive bit and drill chuck. A circular clamp is rotatable and securable to the mounting flange with a connector adjustably fastened through the circular clamp. Left and right rails pivotally extend from the clamp and each is slide-ably adjustable in length along the left and right sides of varying lengths of drill bodies to a point beyond the rear of the drill body to a drill rear end. A connector adjustably is fastened to the rear ends of the rails to adjustably draw the ends together for securing the shear attachment to the drill body. The clamp may be loosened to rotate the shear attachment, and shear blades, within the clamp for shear blade orientation anywhere along the 360 degree axial arc. After which, the clamp is tightened for safe, one-handed operation of the drill with the shear attachment and shear blades oriented in the desired direction.

A principle object and advantage of the present invention is that the drill shear attachment clamp secures the shear attachment to any length of portable drill so the shear attachment may be used wherein shear blade orientation is anywhere along a 360° axial arc.

Another object and advantage of the present invention of the present invention is that it makes a portable drill into a power shear almost instantly with attachment to the chuck and securement of the rails about the body of the drill without the need for any tools.

Another object and advantage of the present invention is that it is capable of navigating tight curved patterns, square cuts, blind cuts, and also suitably making long rip cuts without the premium price of a dedicated power shear.

Another object and advantage of the present invention is that the shear attachment cowling safely prevents hair and loose clothing from coming into contact with any of the rotating parts as to prevent injury to the operator.

Another object and advantage of the present invention is that the shear attachment cowling is at least partially transparent to permit visual aid in connecting the drill chuck to the shear attachment's drive bit.

Another object and advantage of the present invention is that the shear attachment cowling has a pattern of partial lengthwise cuts to permit easier gripping of the drill chuck to tighten onto the drive bit without a key or tools.

BRIEF DESCRIPTION OF THE DRAWINGS

FIG. 1 is a left side elevational view of the assembled drill shear attachment showing the pivotal rails.

FIG. 2 is an exploded assembly perspective view of the drill shear attachment.

FIG. 3 is a left side perspective view of the shear attachment mounted to a portable drill shown in phantom for illustrative purposes.

FIG. 4 is a left side, partially broken away, perspective view of the shear attachment mounted to a portable drill shown in phantom for illustrative purposes and rotated to zero degrees about its 360° arc B along axis A ready for use.

FIG. 5 is a left side, partially broken away, perspective view of the shear attachment mounted to a portable drill shown in phantom for illustrative purposes and rotated to 90° about its 360° arc B along axis A ready for use.

FIG. 6 is a left side, partially broken away, perspective view of the shear attachment mounted to a portable drill shown in phantom for illustrative purposes and rotated to 135° about its 360° arc B along axis A ready for use.

FIG. 7 is a left side perspective view of the assembled drill shear attachment with the pivotal rails removed showing the cylindrical cowling and a pattern of partial lengthwise cuts through the surface.

DETAILED SPECIFICATION

Referring to FIGS. 1, 2 and 3 the 360° rotatable shear attachment 20 of the present invention generally includes a shear housing 22, forwardly extending shear blades 24, a rearwardly extending drive bit 26, a rearwardly extending mounting flange 25 and an at least partially transparent cylindrical cowling 28; or 28A (shown in FIG. 7) with a pattern of partial lengthwise cuts 29. The 360° rotatable drill shear attachment 20 translates rotational power from the portable drill 10 along axis A into relative movement of the shear blades 24 through drive bit 26.

A circular clamp 30 has eyelets or apertures 32. A connector or threaded bolt 34 is provided to pass through apertures 32, with washers 36 and 38 being provided to simplify tightening of a knurled hand-tightenable nut 40.

Left rail 42 has a fixed portion 43 with front hexagonal-shaped aperture 44 facing outward with respect to axis A to secure bolt head 34 therein and for alignment with clamp apertures 32 and washer 36. The fixed rail portion 43 slides inside of the left rail portion 42 (Arrow C) to adjust in length to accommodate drill bodies 14 of varying lengths. Along left slide-able portion rail 42 is provided a slidable grip pad 46. Rear end 48 of slide-able portion left rail 42 also has rear aperture 50 incorporating a hexagonal shaped recess 63 facing outward with respect to axis A to secure bolt head 34 therein. Similarly, fixed portion right rail 53 has a front aperture 54, optionally incorporating hexagonal shaped recess 55 facing outward with respect to axis A, for alignment with clamp apertures 32 and washer 38, and slides inside of a slide-able portion right rail 52. Along right slide-able portion rail 52 is provided a slidable grip pad 56. Rear end 58 of right slide-able portion rail 52 also has rear aperture 60 optionally incorporating hexagonal shaped recess 63 facing outward with respect to axis A. Another connector or threaded bolt 62 is provided for passing through rear apertures 50 and 60 with washers and securement thereat with knurled hand-tightenable nut 64.

As shown in FIG. 3, portable drill 10 illustratively shown in phantom generally includes a grip 12, a housing, or body 14 that is elongate and supports a forward collar 16. Forward of the collar 16 is a bit chuck 18 which rotates about axis A. The drill 10 has a rear end 19.

Installation of the 360° rotatable shear attachment 20 is relatively simple. The knurled hand-tightenable nuts 40 and 64 are relatively loose on the attachment 20. The slide-able portion rails 42 and 52 are raised at their rear ends 48 and 58. The drill bit chuck 18 is visually located on the drive bit 26 and the chuck 18 is normally tightened as with a key (not shown) or manually hand gripping down on cowling 28A and drill chuck 18 to tight the chuck onto drive bit 26 without any tools. The rear ends 48 and 58 of slide-able portion rails 42 and 52 are moved outwardly and downward as to fit about the drill body or housing 14. Care is used in locating slidable grip pads 46 and 56 about the drill body 14 as to avoid any vent holes on the drill 10. Next the rear and front knurled nuts 40 and 64 are drawn up snug. The shear attachment 20 is gripped by hand and rotated axially along arc B to orientate the shear blades 24 into desired axial alignment position, as shown in FIGS. 4-6. Then the knurled nuts 40 and 64 are completely tightened to safely secure the shear attachment 20 to the drill body 14. The secured drill shear attachment rail portions 42, 43, 52 and 53 of the present invention prevent the drill 10 jumping out of control or rotating with respect to the shear attachment 20.

By this arrangement, single handed use of the portable drill 10 along with the shear attachment 20 may be used with shear blades 24 in any particular axial arc B of the 360° rotation along axis A again as shown in FIGS. 4-6.

The specification and illustrated embodiments herein are for illustrative purposes only, care being given to the scope of the invention by a review of the following claims.

What is claimed:

1. A 360° rotational drill shear attachment for attachment to a forward bit chuck of a portable drill having an elongate drill body from which extends a hand grip and a drill body rear, the drill shear attachment comprising:
   (a) a shear housing with forwardly extending shear blades and a rearwardly extending cylindrical mounting flange and a drive bit which translates rotational power from the portable drill to be attached to the shear attachment into relative movement of the shear blades through the drive bit;
   (b) the cylindrical mounting flange rearwardly extending from the shear housing to provide a mounting surface;
   (c) a cylindrical cowling securely attached to the mounting flange and extending rearwardly from the shear housing as to cover the drive bit and the forward bit chuck of the drill to be attached to the shear attachment;
   (d) a circular clamp to be rotatably secured and fixed about the mounting flange;
   (e) a left fixed-portion rail pivotally extending from the circular clamp and slide-ably connected to a slide-able portion rail which extends to a left rail rear end for use along the drill body to a point beyond the rear of the drill body to be attached to the shear attachment;
   (f) a right fixed-portion rail pivotally extending from the circular clamp and slide-ably connected to a slide-able portion rail which extends to a right rail rear end for use along the drill body to a point beyond the rear of the drill body to be attached to the shear attachment; and
   (g) a connector fastened to the left and right rail rear ends to adjustably draw the rail ends together for non-rotateably securing the fixed-portion rails and the slide-able portion rails to the drill body to be attached to the shear attachment for one-handed operation of the drill with the shear blades and the shear housing rotatable about a 360° axial arc with respect to the drill to be attached to the shear attachment.

2. The drill shear attachment of claim 1, further comprising a grip pad on each of the slide-able portion rails to anti-slip grip the drill body.

3. The drill shear attachment of claim 1, wherein the rail rear ends each has an aperture therethrough which incorporate hexagonal shaped recesses facing outward with respect to a longitudinal axis of the attachment.

4. The drill shear attachment of claim 3, wherein the connector comprises a threaded bolt and an adjustable knurled nut.

5. The drill shear attachment of claim 1 wherein the cowling is at least partially transparent.

6. The drill shear attachment of claim 1 wherein the clamp has aligned apertures and a threaded bolt and an adjustable knurled nut for fixed securement of the clamp about the mounting flange.

7. The drill shear attachment of claim 1 wherein the cowling is flexible with longitudinal slits to permit gripping of the forward bit chuck to tighten onto the drive bit.

8. A 360° rotational drill shear attachment for attachment to a forward bit chuck of a portable drill having an elongate drill body from which extends a hand grip and a drill body rear, the drill shear attachment comprising:
   (a) a shear housing with forwardly extending shear blades and a rearwardly extending drive bit which translates rotational power from the portable drill to be attached to the shear attachment into relative movement of the shear blades through the drive bit;
   (b) the shear housing with a rearwardly extending cylindrical mounting flange as to provide a mounting surface;
   (c) a cylindrical cowling securely extending rearwardly from the mounting flange as to cover the drive bit and the forward bit chuck of the drill to be attached to the shear attachment;
   (d) a circular clamp to be rotatably secured and fixed about the mounting flange;

(e) a left rail pivotally extending from the circular clamp to a left rear rail end with a grip pad there between for use along the drill body, the left rear rail end extending to a point beyond the rear of the drill body to be attached to the shear attachment;

(f) a right rail pivotally extending from the circular clamp to a right rear rail end with a grip pad there between for use along the drill body, the right rear rail end extending to a point beyond the rear of the drill body to be attached to the shear attachment; and (g) a connector fastened to the left and right rail rear ends to adjustably draw the rail ends together for nonrotatably securing the rails to the drill body to be attached to the shear attachment for one-handed operation of the drill with the shear blades and the shear housing rotatable about a 360° axial arc with respect to the drill to be attached to the shear attachment.

9. The drill shear attachment of claim 8, wherein the rail rear ends each has an aperture therethrough which incorporate hexagonal shaped recesses facing outward with respect to a longitudinal axis of the attachment.

10. The drill shear attachment of claim 9, wherein the connector comprises a threaded bolt and an adjustable knurled nut.

11. The drill shear attachment of claim 8 wherein the cowling is at least partially transparent.

12. The drill shear attachment of claim 8 wherein the clamp has aligned apertures and a threaded bolt and an adjustable knurled nut for fixed securement of the clamp about the mounting flange.

13. The drill shear attachment of claim 8 wherein the cowling is flexible with longitudinal slits to permit gripping of the forward bit chuck to tighten onto the drive bit.

14. A 360° rotational drill shear attachment for attachment to a forward bit chuck of a portable drill having an elongate drill body from which extends a hand grip and a drill body rear, the drill shear attachment comprising:

(a) a shear housing with forwardly extending shear blades and a rearwardly extending drive bit which translates rotational power from the portable drill to be attached to the shear attachment into relative movement of the shear blades through the drive bit;

(b) the shear housing with a rearwardly extending cylindrical mounting flange as to provide a mounting surface;

(c) a cylindrical at least partially transparent cowling securely extending rearwardly from the shear housing as to cover the drive bit and the forward bit chuck of the drill to be attached to the shear attachment;

(d) a circular clamp to be rotatably secured and fixed about the mounting flange;

(e) a left rail pivotally extending from the circular clamp to a left rail rear end and slide-ably adjustable in length for use along drill bodies of various lengths to be attached to the shear attachment to a point beyond the rear of the drill body with a grip pad on the left rail for use along the drill body to be attached to the shear attachment;

(f) a right rail pivotally extending from the circular clamp to a right rail rear end and slide-ably adjustable in length for use along drill bodies of various lengths to be attached to the shear attachment to a point beyond the rear of the drill body with a grip pad on the right rail for use along the drill body to be attached to the shear attachment; and (g) a connector fastened to the rail rear ends to adjustably draw the rail ends together for nonrotatably securing the rails to the drill body for one-handed operation of the drill with the shear blades and the shear housing rotatable about a 360° axial arc with respect to the drill to be attached to the shear attachment.

15. The drill shear attachment of claim 14, wherein the connector comprises a threaded bolt and an adjustable knurled nut.

16. The drill shear attachment of claim 14 wherein the clamp has aligned apertures and a threaded bolt and an adjustable knurled nut for fixed securement of the clamp about the mounting flange.

17. The drill shear attachment of claim 14 wherein the cowling is flexible with longitudinal slits to permit gripping of the forward bit chuck to tighten onto the drive bit.

\* \* \* \* \*